US008004234B2

(12) United States Patent
Walrath

(10) Patent No.: US 8,004,234 B2
(45) Date of Patent: *Aug. 23, 2011

(54) PRIORITIZING POWER-CONSUMING APPLICATIONS OF AN ELECTRONIC DEVICE POWERED BY A BATTERY

(75) Inventor: Craig A. Walrath, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/898,973

(22) Filed: Oct. 6, 2010

(65) Prior Publication Data

US 2011/0029799 A1 Feb. 3, 2011

Related U.S. Application Data

(63) Continuation of application No. 12/544,261, filed on Aug. 20, 2009, now Pat. No. 7,834,585, which is a continuation of application No. 11/412,490, filed on Apr. 27, 2006, now Pat. No. 7,598,702.

(51) Int. Cl.
*H01M 10/46* (2006.01)
(52) U.S. Cl. ...................................................... 320/107
(58) Field of Classification Search .................. 320/107, 320/114, 115, 132
See application file for complete search history.

(56) References Cited

U.S. PATENT DOCUMENTS

| 5,915,120 | A | 6/1999 | Wada | |
|---|---|---|---|---|
| 7,598,702 | B2* | 10/2009 | Walrath | 320/107 |
| 2001/0020940 | A1 | 9/2001 | Nakazato | |
| 2003/0149904 | A1 | 8/2003 | Kim | |
| 2004/0029621 | A1 | 2/2004 | Karaoguz | |
| 2004/0041538 | A1 | 3/2004 | Sklovsky | |
| 2007/0004467 | A1* | 1/2007 | Chary | 455/572 |

FOREIGN PATENT DOCUMENTS

EP 1617316 1/2006

OTHER PUBLICATIONS

European Patent Office, Communication, Appln No. 11155615.5, date of mailing Apr. 6, 2011.
European Patent Office, Summons to attend oral proceedings pursuant to Rule 115(1) EPC, Appln. No. 07749806.1, date of mailing Apr. 5, 2011, 8 p.

* cited by examiner

*Primary Examiner* — Edward Tso

(57) ABSTRACT

A power management system comprises a power management module configured to receive a requested duration for powering an electronic device by a battery, the power management module configured to control use of power-consuming elements of the electronic device based on a prioritization of the power-consuming elements to enable powering of the electronic device by the battery for at least the requested duration.

18 Claims, 3 Drawing Sheets

PRIORITIZING POWER-CONSUMING APPLICATIONS OF AN ELECTRONIC DEVICE POWERED BY A BATTERY

CROSS-REFERENCE TO RELATED APPLICATIONS

This application is a continuation of U.S. Ser. No. 12/544,261 filed on 20 Aug. 2009, now U.S. Pat. No. 7,834,585, which is a continuing application of U.S. Ser. No. 11/412,490, now U.S. Pat. No. 7,598,702 filed on 27 Apr. 2006 and issued on 6 Oct. 2009, which are incorporated herein by reference.

BACKGROUND OF THE INVENTION

Electronic devices are often configured to be powered by a battery or other type of depletable power source (e.g., rechargeable and non-rechargeable batteries, fuel cells, solar-based cells or batteries, etc.). However, these types of power sources can provide power for limited time before needing recharging (if possible) or replacement. Thus, an individual often needs to be able to use the electronic device for a longer period of time than these power sources are able to provide power to the electronic device.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
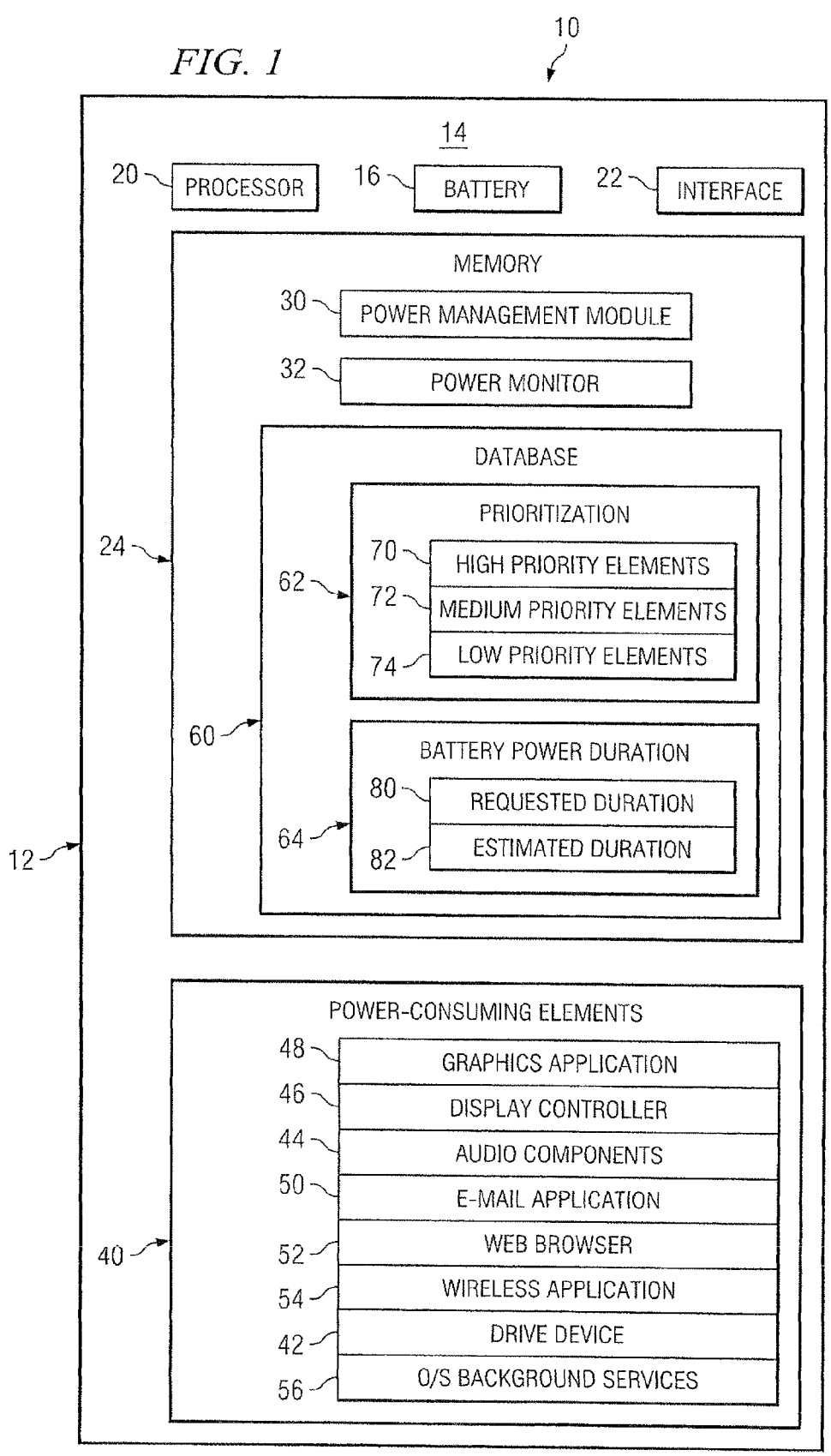
FIG. 1 is a block diagram illustrating an embodiment of a power management system in accordance with the present invention.
Figure 2:
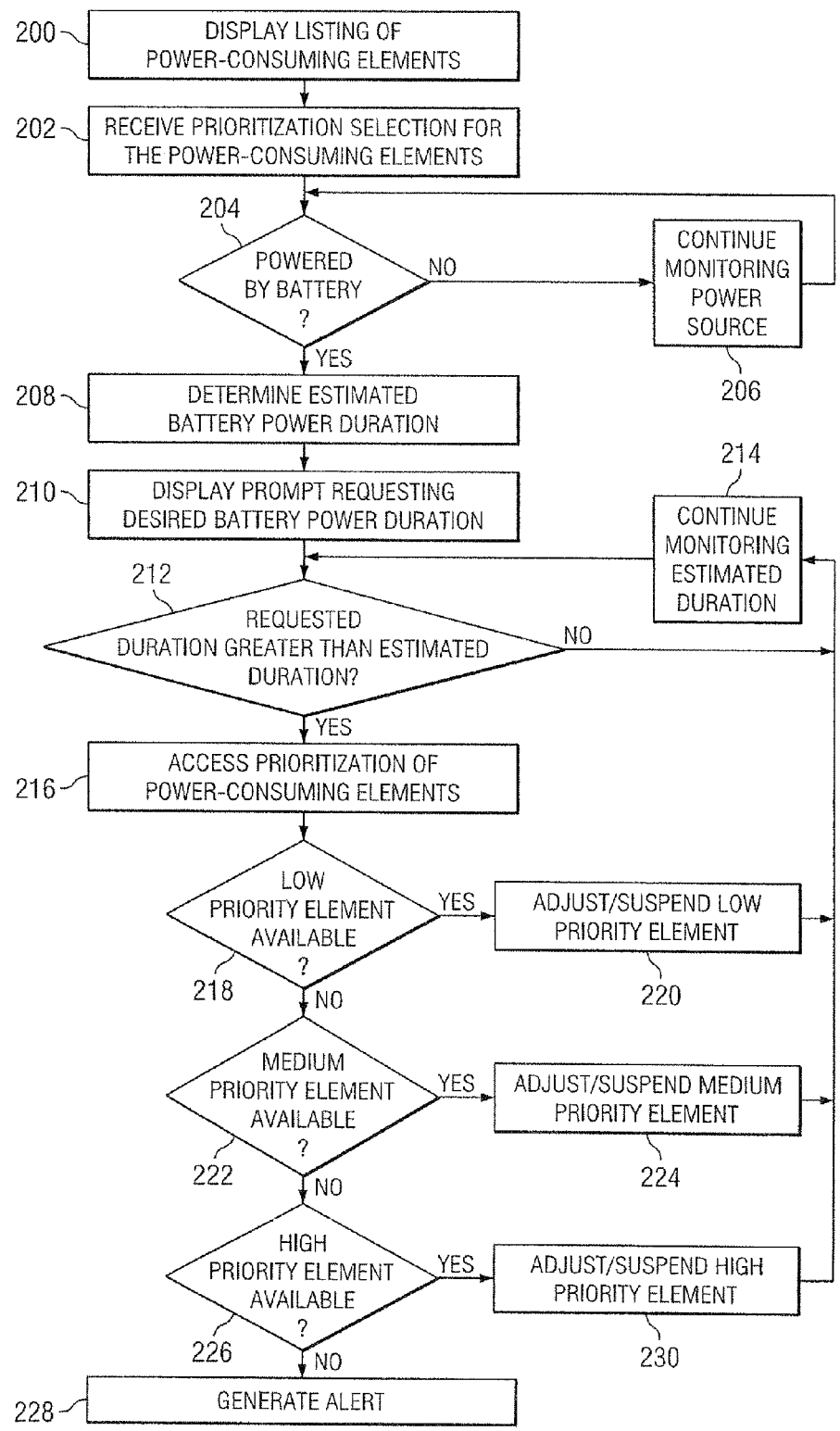
FIG. 2 is a flow diagram illustrating an embodiment of a power management method in accordance with the present invention.
Figure 3:
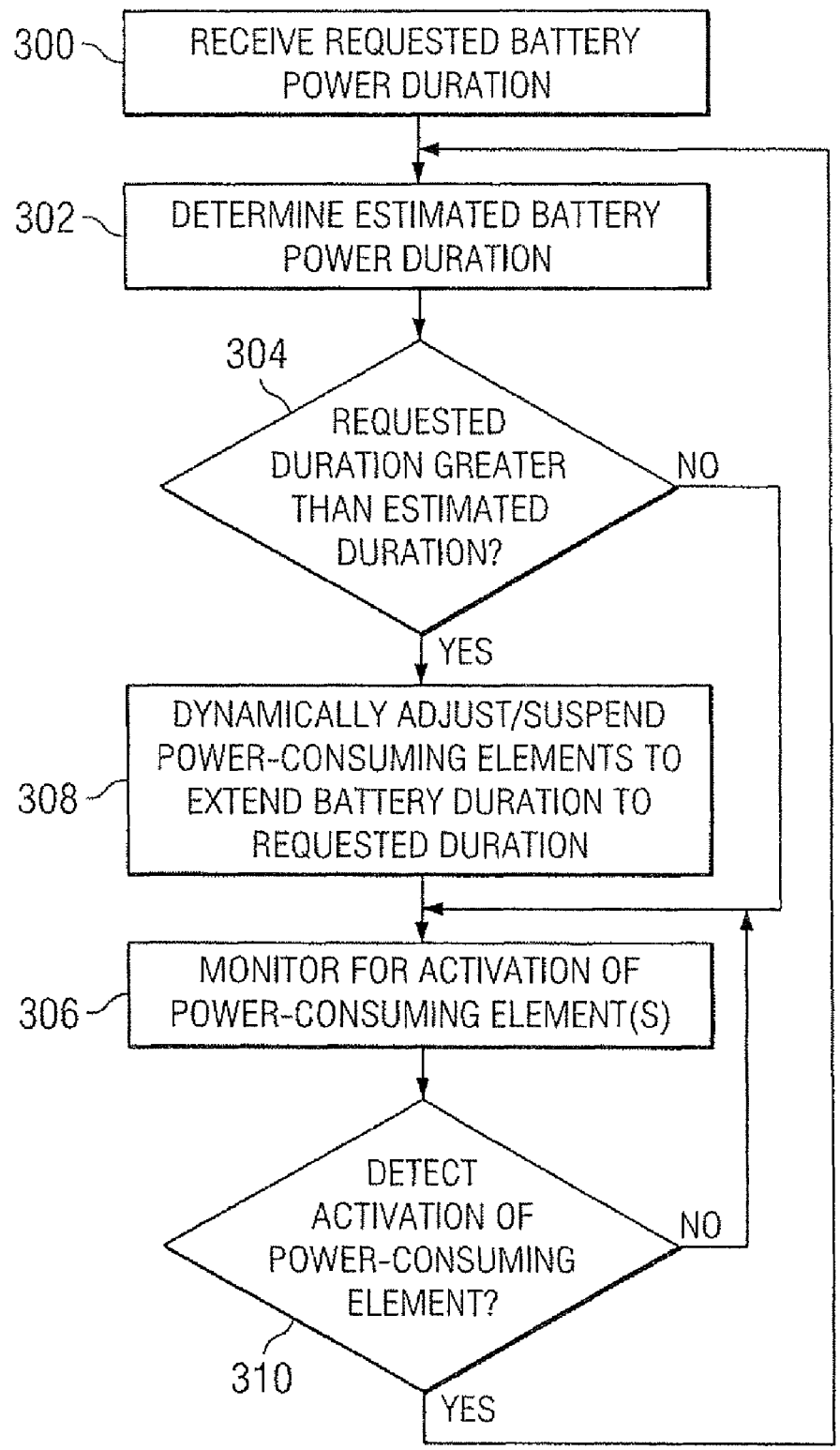
FIG. 3 is a flow diagram illustrating another embodiment of a power management method in accordance with the present invention.

The preferred embodiments of the present invention and the advantages thereof are best understood by referring to FIGS. 1-3 of the drawings, like numerals being used for like and corresponding parts of the various drawings.

FIG. 1 is a block diagram illustrating an embodiment of a power management system 10 in accordance with the present invention. In the embodiment illustrated in FIG. 1, system 10 is implemented in an electronic device 12. For ease of illustration and description of an exemplary embodiment of the present invention, system 10 will be described as being embodied in a laptop or a notebook computer 14. However, it should be understood that system 10 may be implemented in other types of electronic devices such as, but not limited to, a personal digital assistant, tablet computer, cellular telephone, electric vehicle, or handheld game or entertainment device. In the embodiment illustrated in FIG. 1, electronic device 12 is configured to be powered by a battery 16. The term "battery" as used herein shall mean any type of depletable power source that is generally capable of providing power for a limited amount of time before the power source needs to be recharged, refueled and/or replaced such as, but not limited to, a rechargeable or non-rechargeable battery, fuel cell, solar cell or battery, etc. It should be understood that electronic device 12 may be configured to be solely powered by battery 16 or convertible such that electronic device may be powered by battery 16 or an external power supply (e.g., an alternating current power source). In the embodiment illustrated in FIG. 1, battery 16 is illustrated as forming part of electronic device 12. However, it should be understood that battery 16 may comprise an external battery coupled to electronic device 12. It should further be understood that electronic device 12 may be configured to be powered by multiple batteries 16.

In the embodiment illustrated in FIG. 1, electronic device 12 comprises a processor 20, an interface 22 and a memory 24. Interface 22 comprises any type of device for outputting information from electronic device 12 and/or receiving information as input to electronic device 12. For example, interface 22 may comprise a keyboard, mouse, display, touch screen, microphone, speaker, buttons, wireless or wired controls, levers, sliders or any other type of input/output device (s). In the embodiment illustrated in FIG. 1, memory 24 comprises a power management module 30 and a power monitor 32. Power management module 30 and power monitor 32 may comprise hardware, software, firmware or a combination thereof. In FIG. 1, power management module 30 and power monitor 32 are illustrated as separate components. However, it should be understood that the operational and/or functional characteristics of power management module 30 and/or power monitor 32 may be configured to be performed by a single element or multiple elements.

Power management module 30 is configured to dynamically control use of power-consuming elements associated with electronic device 12 based on a predetermined and/or dynamic prioritization of the power-consuming elements to enable use of electronic device 12 for a requested or desired duration using power supplied by battery 16. For example, if a user of electronic device desires to be able to use electronic device 12 using power supplied by battery 16 for at least two hours, power management module 30 dynamically controls use of one or more power-consuming elements of electronic device to enable use of device 12 for at least two hours under battery 16 power. Thus, for example, for electronic device 12 having multiple functions and/or capabilities, embodiments of the present invention turn off/on and/or otherwise adjust the level of use of one or more of the functions/capabilities of device 12 (e.g., based on the prioritization) while enabling use of other and/or as many functions/capabilities of device 12 as possible (e.g., high priority functions) for a desired time period while powered by battery 16.

Power monitor 32 is used to analyze and/or otherwise estimate a duration of power suppliable by battery 16. Power management module 30 cooperates and/or otherwise interfaces with power monitor 32 to dynamically control use of power-consuming elements based on the estimated duration of power suppliable by battery 16 to enable use of electronic device 12 for a desired duration. For example, if a user would like to use notebook computer 14 for a period of two hours while being powered by battery 16, but battery 16 is capable of only supplying one hour of power based on the current power consumption of notebook computer 14, embodiments of the present invention control the use and/or operational status or level of one or more power-consuming elements of notebook computer 14 to enable use of notebook computer 14 for at least two hours. Thus, in operation, power management module 30 adjusts and/or otherwise ceases various operational parameters of power-consuming elements of electronic device 12 to ensure operation of electronic device 12 for the requested duration.

In the embodiment illustrated in FIG. 1, electronic device 12 comprises power-consuming elements 40. In FIG. 1, power-consuming elements 40 comprise a drive device 42, audio component(s) 44, a display controller 46, a graphics application 48, an e-mail application 50, a web browser 52, a wireless application 54, and operating system (O/S) background application(s) or service(s) 56. It should be understood that power-consuming elements 40 may comprise additional and/or alternative elements depending on the type of electronic device 12 and/or function (e.g., wireless controller/subsystem, Ethernet controller/subsystem, camera, lights, media player, microphone, operating system components, drivers, middleware, software applications, applets, subroutines, etc.). For ease of illustration, power-consuming elements 40 are shown as being separate and/or apart from memory 24. However, it should be understood that various types of power-consuming elements 40 may reside in memory 24 (e.g., display controller 46, graphics application 48, an e-mail application 50, a web browser 52, a wireless application 54, and operating system (O/S) background application(s) or service(s) 56).

In FIG. 1, electronic device 12 also comprises a database 60 having information associated with a prioritization 62 of power-consuming elements 40 and a battery-power duration 64. Prioritization 62 comprises a prioritization of various power-consuming elements 40 (e.g., a level of importance to a user of electronic device 12) to facilitate control of use of power-consuming elements 40 to enable operation of electronic device 12 by battery 16 for a requested period of time or duration. For example, in the embodiment illustrated in FIG. 1, prioritization 62 comprises a listing of high priority elements 70, medium priority elements 72 and low priority elements 74. High priority elements 70 generally comprise an identification of one or more power-consuming elements 40 having a generally high level of priority of use by a user of electronic device 12. Low priority element 74 generally comprise an identification of one or more power-consuming elements 40 considered as having a low level of priority of use by a user of electronic device 12. Correspondingly, medium priority elements 72 comprise an identification of one or more power-consuming elements 40 having a priority level of use greater than low priority elements 74 but less than high priority elements 70. It should be understood that the priority levels used herein are for illustrative purposes only as the prioritization could be more or less granular.

In some embodiments of the present invention, prioritization 62 is dynamic and/or contains multiple levels of priority. For example, in some embodiments of the present invention, particular power-consuming elements 40 may be identified as having a fixed priority level (e.g., for a cellular telephone, the functions associated with receiving and outgoing calls as high priority elements 70) while other power-consuming elements 40 may have a variable priority (even temporary) based on use or other factors (e.g., game playing on the cellular telephone may be identified as a low priority element 74, but its priority level may change to a higher level in response to a user opening the game function). Thus, for example, for a cellular telephone, game playing and camera use may both be identified as low priority elements 74. However, in response to a user initiating and/or otherwise opening the game function, the game playing element 40 is, at least temporarily, moved to a higher priority level (e.g., a medium priority level 72) such that the camera use may be inoperable in order to support use of the game functions. If the user closes the game function, the priority level associated with the game function preferably returns to its default level (e.g., low priority element 74).

In some embodiments of the present invention, prioritization 62 is configurable having different sets of priorities. For example, the use of a particular device 12 may vary depending on whether device 12 is used at home, at work, in the car, the time of day, day of the week, etc. Thus, in some embodiments of the present invention, priority levels for different power-consuming elements 40 vary between different categories or sets of prioritization 62. Accordingly, in some embodiments of the present invention, while a word processing application may have a higher priority level in a work environment, the word processing application may have a lower priority level at night or on the weekend. Preferably, device 12 is configured to enable a user to select a particular set of prioritization 62 to be used for different types of usage or circumstances. However, it should be understood that in some embodiments of the present invention, prioritization 62 is configurable with a single set of priorities.

In some embodiments of the present invention, prioritization 62 is based on other factors such as, but not limited to, a signal received by device 12 (e.g., in response to a universal serial bus (USB) device being plugged into device 12, headphones being plugged into device 12, etc.), a message received by device 12 (e.g., a message received from a network and/or an indication that a network is detected/not detected) and physical changes to device 12 (e.g., opening or closing of a notebook computer lid, accelerometer signals resulting from movement of a portable computer, etc.). Thus, for example, if a wireless network is detected or if a USB device is plugged into device 12, various applications or functions associated with such actions are given a higher priority level to facilitate use thereof.

Battery power duration 64 information comprises a requested battery power duration 80 and an estimated battery duration 82. Estimated battery power duration 82 comprises information associated with an estimated life or duration of suppliable power by battery 16 (e.g., as determined by power monitor 32). For example, power monitor 32 analyzes existing power draw conditions of electronic device 12 and various characteristics of battery 16 to determine an estimated duration of suppliable power by battery 16. Requested battery power duration 80 comprises information associated with a requested duration of use of electronic device 12 using battery 16 for a power source.

Thus, in operation, a user of electronic device 12 inputs and/or otherwise identifies prioritization 62 for various power-consuming elements 40 of electronic device 12 (e.g., via interface 22). For example, if the user of electronic device 12 desires to primarily utilize graphics application 48, the user indicates graphics application 48 as a high priority element 70. Other power-consuming elements 40 may be identified by the user as high priority elements 70, medium priority elements 72 and/or low priority elements 74. For example, if the user does not anticipate using web browser 52 or e-mail application 50, web browser 52 and e-mail application 50 may be identified by the user as low-priority elements 74. Input for prioritization 62 of power-consuming elements 40 may be performed using a variety of different methods such as, but not limited to, slidebars, selectable buttons or icons indicating a priority level, or an ordered listing where a location of the power-consuming element 40 within the list indicates its priority level. In operation, embodiments of the present invention turn off, reduce a power level, and/or otherwise control use of power-consuming elements 40 to provide as much functionality as possible for device 12 while enabling the device 12 to operate for the requested time period (e.g., by turning off low priority elements 74 first, followed by medium priority elements 72, and then high priority elements 70, as necessary, until the power available to operate device 12 for the requested duration by battery 16 is achieved).

In operation, the user of electronic device 12 inputs requested battery power duration 80 (e.g., via interface 22 (e.g., using a slider, buttons, remote control, voice, keyboard, mouse, hand gesture, etc.)) indicating a desired time for using electronic device 12 while powered by battery 16. For example, if the user desires to be able to use notebook computer 14 for a period of three hours (e.g., for the duration of a three hour airplane flight), the user inputs three hours as requested duration 80. In some embodiments of the present invention, device 12 is configured to enable a user to indicate or specify a particular time (e.g., a particular day, a particular time of day, etc.) until which use of device 12 is desired. For example, the user may indicate that use of the device 12 is desired until a particular time of day (e.g., 4:00 p.m.) such that device 12 calculates and/or otherwise computes the duration of usage (e.g., by comparing the current/present time to the inputted desired time) and counts down and/or otherwise keeps track of the remaining time of use. Further, embodiments of the present invention enable a change or adjustment to the requested duration 80. For example, if the duration 80 requested is four hours, but after three hours, the user desires an additional one hour, device 12 is configure to dynamically respond to the duration 80 adjustment by monitoring and/or controlling use of power-consuming elements 40 to enable use of device 12 for the remaining hour and the additional hour.

Power monitor 32 analyzes battery 16 and various power draw conditions of electronic device 12 and determines estimated battery power duration 82 for electronic device 12 while being powered by battery 16. For example, a user of notebook computer 14 may have graphics application 48, browser 52 and e-mail application 50 operating and/or running, thereby resulting in a particular power draw from battery 16. Further, as various power-consuming elements 40 are initiated and/or cessated, the power draw from battery 16 will change. Power monitor 32 is preferably configured to monitor the power draw conditions of electronic device 12 and various characteristics of battery 16 to determine an estimated duration of use or life of battery 16. Power monitor 32 may be configured to monitor and/or otherwise determine estimated duration 82 on a continuous or periodic basis.

Power management module 30 interfaces and/or otherwise communicates with power monitor 32 to identify estimated battery power duration 82 and compares estimated battery power duration 82 with requested battery power duration 80. If estimated battery power duration 82 is less than requested battery power duration 80, power management module 30 automatically controls use of power-consuming elements 40 based on prioritization 62 to enable use of electronic device 12 while powered by battery 16 for the requested duration 80. For example, if the requested duration 80 is three hours but the estimated duration 82 is two hours, power management module 30 automatically accesses prioritization 62 and automatically controls and/or cessates use of one or more power-consuming elements 40 to enable use of electronic device 12 for the requested duration of three hours. Preferably, power management module 30 controls and/or ceases use of low priority elements 74 before controlling and/or cessating use of medium priority elements 72, and controls and/or cessates use of medium priority elements 72 before controlling and/or cessating use of high priority element 70. Thus, if e-mail application 50 is identified as a low priority element 74, power management module 30 automatically closes and/or cessates use of e-mail application 50. For example, in response to closing of e-mail application 50, if the estimated duration 82 is no longer less than the requested duration 80 (e.g., sufficient power is available), no further action by power management 30 may be necessary. However, if the estimated duration 82 remains less than the requested duration 80, power management module 30 proceeds to control and/or cease use of additional low priority elements 74, medium priority elements 72 and/or high priority elements 70 to enable use of the electronic device 12 for the requested duration 80. It should be understood that power management module 30 may be configured to analyze and/or control use of power-consuming elements 40 on a continuous or periodic basis.

In some embodiments of the present invention, power management module 30 is configured to iteratively control use of power-consuming elements 40 (e.g., turning off one element 40 at a time until requested duration 80 is achieved). However, it should be understood that power management module 30 may be configured to control multiple elements 40 concurrently. For example, particular elements 40 may have dependent elements 40 (e.g., if one element 40 is turned off, other elements 40 that operate with or are based on the turned-off element 40 are also turned off). Thus, by turning off one element 40, power savings associated with multiple elements 40 is achieved. Further, in some embodiments of the present invention, power management module 30 and/or power monitor 32 is configured to determine the power usage of independent elements 40 or groups of elements 40 such that if a particular level of power savings is needed to achieve the requested duration 80, power management module 30 is configured to control use of particular elements 40 or groups of elements 40 to achieve a desired level of power savings.

The controlling of use of power-consuming elements 40 to reduce power consumption by electronic device 12 may be performed using a variety of methods. For example, in some embodiments of the present invention, adjustment of display controller 46 comprises automatically adjusting (e.g., decreasing) an intensity level of a display or the displayed resolution of image content, adjusting wireless application 54 and/or drive device 42 comprises automatically placing wireless application 54 and/or drive device 42 in a sleep or hibernation state or shutting down the wireless application 54 and/or drive device 42. Thus, in some embodiments of the present invention, various settings and/or functions of a particular element 40 may be adjusted to reduce power consumption associated with the particular element 40 while enabling continued use of that particular element 40 (e.g., automatically decreasing a resolution setting, automatically adjusting displayed colors of a graphic display to black and white, etc.). Further, controlling of power-consuming elements 40 to reduce the power consumption of electronic device 12 may comprise automatically closing particular applications (e.g., closing e-mail application 50, web browser 52 and/or services 56 running in the background of an operating system).

Additionally, in some embodiments of the present invention, power management module 30 is configured to prevent opening and/or otherwise initiating use of particular power-consuming elements 40 or requests authorization to open and/or initiate use of a particular power-consuming element 40. For example, in such embodiments of the present invention, if a user attempts to open and/or initiate use of a particular power-consuming element 40 that has previously been turned off and/or adjusted to reduce power consumption and/or that is identified as having a priority level that would require control to maintain the requested battery power duration 80 (e.g., a low priority element 74), power management module 30 is configured to prevent opening or using the particular power-consuming element 40 and/or display a notice to the user indicating use of the particular power-consuming element 40 may adversely affect the requested duration 80 and/or may necessitate control of other and/or higher priority elements (e.g., medium priority elements 72 and/or high priority elements 70).

In some embodiments of the present invention, power management module 30 is configured to provide and/or otherwise display a notice or other type of indication that one or more power-consuming elements 40, or a particular power-consuming element 40, will be controlled in order to maintain the requested duration 80. For example, in one embodiment of the present invention, before use of a particular power-consuming element 40 is controlled and/or changed, the notice of use control provides the user with the opportunity to close or cease use of other power-consuming elements 40 to reduce power consumption and/or enables the user to re-prioritize the prioritization 62.

It should also be understood that for different types of electronic or battery-powered devices, different types of control of use may be performed. For example, if the electronic device 12 comprises a vehicle configured to be partially and/or fully battery powered, power management module 30 may be configured to prevent the use of particular power-consuming elements 40 to enable use of the vehicle for the requested duration 80 (e.g., preventing use of a radio or audio components 44 of the vehicle, dimming interior lighting of the vehicle, shutting off and/or preventing use of air conditioning, dimming exterior lights such as running lights (while leaving headlights and tail/brake lights at full power), etc.).

Further, power management module 30 is configured to dynamically respond to activation and/or deactivation of various power-consuming elements 40. For example, in some embodiments of the present invention, power management module 30 is configured to automatically open or control use of power-consuming elements 40 in response to a surplus of battery 16 power. In this example, if one or more power-consuming elements 40 was previously adjusted and/or closed to facilitate use of electronic device 12 for the requested duration 80 and subsequently other power-consuming elements 40 are closed and/or adjusted (e.g., closing of a particular application or element 40 by a user), power management module 30 is configured to automatically open and/or adjust/enable use of the previously closed elements 40. For example, if power management module 30 previously closed e-mail application 50 to facilitate use of electronic device 12 for the requested duration 80 and subsequently a user closes graphics application 48 or another power-consuming element 40, power management module 30 is configured to automatically re-open e-mail application 50 (or enable it to be opened) provided opening of e-mail application 50 does not result in the estimated duration 82 being less than the requested duration 80. Thus, power management module 30 is configured to dynamically respond to the use and/or non-use of various power-consuming elements 40 to facilitate use of electronic device 12 for the requested duration 80.

In some embodiments of the present invention, power management module 30 is configured to notify a user if estimated duration 82 is less than the requested duration 80. For example, in some embodiments of the present invention, if estimated duration 82 is less than the requested duration 80, power management module 30 is configured to indicate to the user the estimated duration 82 and/or indicate or suggest to the user other power-consuming elements 40 that may be controlled to achieve requested duration 80. Power management module 30 may also be configured to indicate to the user the power-consuming elements 40 presently running/operating and request that the user select particular power-consuming elements 40 to control in order to achieve the requested duration 80.

Embodiments of the present invention also dynamically respond to changes in use of power-consuming elements 40 and/or changes in a power supply to device 12. For example, if battery 16 is replaced with another battery 16, power management module 30 is configured to automatically re-evaluate the requested duration 80 relative to the estimated duration 82 based on the detected condition of the newly inserted battery 16. Further, for example, if device 12 is configured having multiple batteries 16 and/or different types of batteries 16 (e.g., a rechargeable lithium-ion battery and a solar-powered battery), power management module 30 is configured to dynamically respond to different power level conditions. Thus, in this example, if a user of device 12 enters a darkened room, thereby resulting in potentially less power being available from a solar-powered battery, power management module 30 dynamically responds to the change in power level condition by controlling, as necessary, the use of power-consuming elements 40. Correspondingly, if a user of device 12 leaves a darkened room and enters into sunlight, power management module 30 dynamically responds to the probable increase in available power by enabling use of or activating power-consuming elements 40.

FIG. 2 is a flow diagram illustrating an embodiment of an electronic device power management method in accordance with the present invention. The method begins at block 200, where power management module 30 provides and/or otherwise displays a listing of power-consuming elements 40 of electronic device 12. For example, in some embodiments of the present invention, power management module 30 is configured to display power-consuming elements 40 via interface 22 (e.g., as textual and/or graphical icons representing the power-consuming element 40 of electronic device 12) to facilitate prioritization of power-consuming elements 40 by a user of electronic device 12. However, it should be understood that in some embodiments of the present invention, displaying a listing of power-consuming elements 40 may be optional and/or unnecessary (e.g., using a default or previously input prioritization). At block 202, power management module 30 receives prioritization 62 from a user of electronic device 12. For example, prioritization 62 preferably comprises a classification of various power elements 40 as either low priority elements 74, medium priority elements 72 or high priority elements 70. At decisional block 204, a determination is made whether electronic device 12 is currently powered by battery 16. For example, in some embodiments of the present invention, electronic device 12 is configured to be powered by either battery 16 or an external power supply (e.g., an alternating current power supply). Preferably, power monitor 32 monitors the source of power for operating electronic device 12. If it is determined that electronic device 12 is not currently powered by battery 16, the method proceeds to block 206, where power monitor 32 continues to monitor the source of power for operating electronic device 12. If it is determined at decisional block 204 that electronic device 12 is being powered by battery 16, the method proceeds to block 208, where power monitor 32 determines estimated battery power duration 82.

At block 210, power management module 30 displays a prompt and/or otherwise requests a user to indicate a desired battery power duration 80 for operating electronic device 12. For example, in some embodiments of the present invention, in response to electronic device 12 being powered by battery 16, power management module 30 automatically requests from a user a desired duration for operation of electronic device 12 using battery 16. However, it should be understood that requested duration 80 may be configured as a default value or may have been previously input/stored. In response to receiving requested duration 80, at decisional block 212, a determination is made whether the requested duration 80 is greater than the estimated duration 82. If the requested duration 80 is not greater than the estimated duration 82, the method proceeds to block 214, where power management module 30 and/or power monitor 32 continues monitoring the estimated battery-power duration 82 of battery 16 relative to the requested duration 80. If the requested duration 80 is greater than the estimated duration 82, the method proceeds to block 216, where power management module 30 accesses prioritization 62 of power-consuming elements 40 of electronic device 12.

At decisional block 218, a determination is made whether any low priority elements 74 are available for control and/or cessation. If at least one low priority element 74 is available for control and/or cessation, the method proceeds to block 220, where power management module 30 automatically adjusts and/or suspends operation of at least one low priority element 74 (which may also result in the adjustment and/or suspension of additional "dependent" elements 40 as discussed above). The method proceeds to block 214, where power management module 30 and/or power monitor 32 continue to monitor the estimated duration 82 of battery 16 relative to the requested duration 80. For example, if the requested duration 80 remains greater than the estimated duration 82 of battery 16, the method depicted at blocks 216, 218 and 220 may be repeated until the requested duration 80 is not greater than the estimated duration 82 or until no more power-consuming elements 40 remain available for control.

At the decisional block 218, if a determination is made that no low priority element 74 is available for adjustment and/or cessation, the method proceeds to decisional block 222, where a determination is made whether any medium priority elements 72 are available for control and/or cessation. If a medium priority element 72 is available for control and/or cessation, the method proceeds to block 224, where power management module 30 controls and/or suspends operation of at least one medium priority element 72. The method proceeds to block 214 where power management module 30 and/or power monitor 32 continue to monitor estimated duration 82 of battery 16 relative to the requested duration 80. As discussed above, if the requested duration 80 continues to be greater than the estimated duration 82, the method depicted at blocks 216, 218, 222 and 224 may be repeated until the requested duration 80 is not greater than the estimated duration 82 or until no more power-consuming elements 40 remain available for control.

At the decisional block 222, if a determination is made that no medium priority elements 72 are available for control and/or cessation, the method proceeds to decisional block 226, where a determination is made whether a high priority element 70 is available for control and/or cessation. If a high priority element 70 is available, the method proceeds to block 230, where power management module 30 adjusts and/or suspends operation of at least one high priority element 70. The method proceeds to block 214, where power management module 30 and/or power monitor 32 continue monitoring estimated duration 82 of battery 16 relative to the requested duration 80. As discussed above, the method depicted by blocks 216, 218, 222, 226 and 230 may be repeated until the requested duration 80 is no longer greater than the estimated duration 82 of battery 16 or until no more power-consuming elements 40 remain available for control. At decisional block 226, if a determination is made that no high priority elements 70 are available for control and/or cessation, the method proceeds to block 228, where power management module 30 alerts the user that operation of electronic device 12 for the requested duration 80 may not be possible.

FIG. 3 is a flow diagram illustrating another embodiment of an electronic device power management method in accordance with the present invention. The method begins at block 300, where power management module 30 receives a requested battery power duration 80. At block 302, power monitor 32 determines an estimated battery power duration 82. At decisional block 304, a determination is made whether the requested duration 80 is greater than the estimated duration 82. If it is determined that the requested duration 80 is not greater than the estimated duration 82, the method proceeds to block 306, where power management module 30 and/or power monitor 32 continue to monitor activation and/or operation of additional power-consuming elements 40 relative to the estimated power duration 82 and requested duration 80. If it is determined that the requested duration 80 is greater than the estimated duration 82, the method proceeds from block 304 to block 308, where power management module 30 dynamically controls and/or suspends operation of at least one power-consuming element 40 to extend the duration of power supplied by battery 16 corresponding to the requested duration 80. The method proceeds to block 306.

At decisional block 310, a determination is made whether another power-consuming element 40 has been activated and/or use otherwise initiated. For example, a user and/or another application may automatically invoke and/or otherwise cause operation or activation of a previously unused power-consuming element 40 (e.g., opening and/or using a media player, web browser 52, e-mail application 50, accessing of drive device 42 or another type of power-consuming 40). At decisional block 310, if a determination is made that another power-consuming element has been activated, the method proceeds to block 302, where power management module 30 dynamically responds to the activation of the power-consuming element 40 to determine whether control and/or cessation of one or more power-consuming elements 40 based on prioritization 62 is necessary to maintain operation of the electronic device 12 for the requested duration 80. If it is determined that no further power-consuming element 40 has been activated, the method proceeds to block 306, where power management module 30 and/or power monitor 32 continues monitoring for activation and/or use of a power-consuming element 40.

Thus, embodiments of the present invention enable use of battery-powered electronic device 12 for a desired duration using power supplied by battery 16 by automatically and/or dynamically adjusting power usage by device 12 based on a prioritization 62 of power-consuming elements 40. For example, embodiments of the present invention enable a user to classify and/or otherwise designate a level of use priority for different power-consuming elements 40 of device 12 such that lower priority elements may be automatically closed, adjusted and/or otherwise controlled to reduce the amount of power drawn by device 12 from battery to maintain the use of device 12 for the requested duration 80. It should be understood that in the described methods, certain functions may be omitted, accomplished in a sequence different from that depicted in FIGS. 2 and 3, or performed simultaneously. Also, it should be understood that the methods depicted in FIGS. 2 and 3 may be altered to encompass any of the other features or aspects of the invention as described elsewhere in the specification. Further, embodiments of the present invention may be implemented in software and can be adapted to run on different platforms and operating systems. In particular, functions implemented by power management module 30 and/or power monitor 32, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium.

What is claimed is:

1. A method executed by a portable computer, comprising:
   prioritizing, by the portable computer, software applications that execute with power-consuming elements in the portable computer;
   receiving a desired time to use the portable computer while the portable computer is powered by a battery; and
   selecting, by the portable computer and based on prioritization of the software applications, to stop usage of one of the power-consuming elements to enable use of the portable computer for the desired time.

2. The method of claim 1, wherein the desired time is input as number of hours to use the portable computer while the portable computer is powered by the battery.

3. The method of claim 1, wherein the desired time indicates use of the portable computer while powered by the battery until a particular time of day.

4. The method of claim 1 further comprising:
   prioritizing the software applications as having a high priority and a low priority;
   closing the software applications having the low priority in response to receiving the desired time to use the portable computer while powered by the battery.

5. The method of claim 1 further comprising:
   automatically closing, by the portable computer, a software application to enable the portable computer to run for the desired time;
   automatically re-opening, by the portable computer, the software application when an estimated duration of running the portable computer with the software application being open is longer than the desired time with the software application being closed.

6. The method of claim 1 further comprising:
   iteratively turning off one of the software applications at a time until the portable computer can remain powered by the battery for the desired time.

7. The method of claim 1 further comprising:
   automatically placing a wireless application in sleep or hibernation to reduce power consumption of the portable computer so the portable computer operates by the battery with the desired time.

8. A method executed by a portable electronic device, comprising:
   obtaining priorities for software applications that execute on the portable electronic device that includes a battery and power-consuming elements;
   obtaining a desired time to operate the portable electronic device while the portable electronic device is powered by the battery; and
   changing, by the portable electronic device and based on the priorities for the software applications, an amount of power delivered to one or more of the power-consuming elements to enable the portable electronic device to operate for the desired time.

9. The method of claim 8 further comprising:
turning off software applications having a low priority; and
turning on software applications having a high priority.

10. The method of claim 8 further comprising:
identifying which of the software applications have a fixed priority level and which of the software applications have a variable priority level.

11. The method of claim 8 further comprising:
raising a level of priority of a software application in response to the software application being opened while the portable electronic device is powered by the battery.

12. The method of claim 8 further comprising:
lowering a level of priority of a software application in response to the software application being closed while the portable electronic device is powered by the battery.

13. The method of claim 8 further comprising:
receiving a message from a network;
prioritizing the software applications based on the message received from the network.

14. The method of claim 8 further comprising:
prioritizing the software applications based on whether a Universal Serial Bus (USB) device is plugged into the portable electronic device.

15. The method of claim 8 further comprising:
estimating a battery power duration time for the portable electronic device to operate by the battery;
comparing the battery power duration time with the desired time;
turning off one of the power-consuming elements when the battery power duration time is less than the desired time.

16. An electronic device, comprising:
power-consuming elements;
a battery to power the power-consuming elements; and
a processor that executes software applications and adjusts power supplied to the power-consuming elements based on priorities assigned to the software applications and based on a desired duration of time for the electronic device to operate while being powered by the battery.

17. The electronic device of claim 16, wherein the processor estimates a duration of time for the electronic device to be powered by the battery and turns off one of the power-consuming elements having a lower priority and leaves on another of the power-consuming elements while the electronic device is powered by the battery.

18. The electronic device of claim 16, wherein the processor re-evaluates adjustment of power being supplied to the power-consuming elements when the battery is replaced with another battery.

* * * * *